J. A. McLAUGHLIN.
FRICTION GEARING.
APPLICATION FILED FEB. 1, 1912.
1,036,134.
Patented Aug. 20, 1912.
2 SHEETS—SHEET 1.
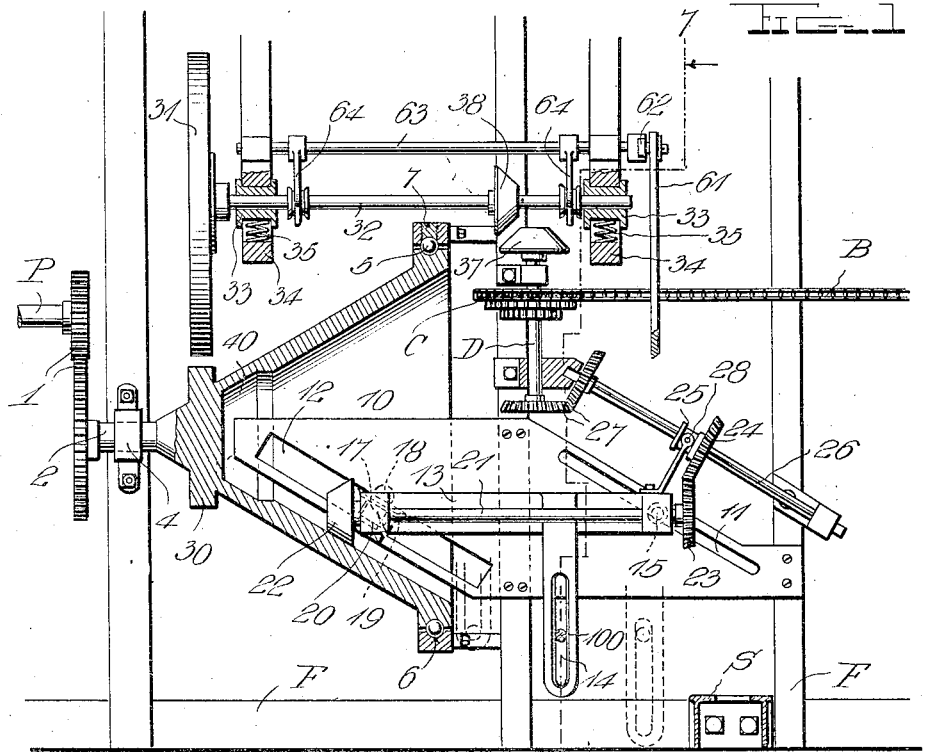
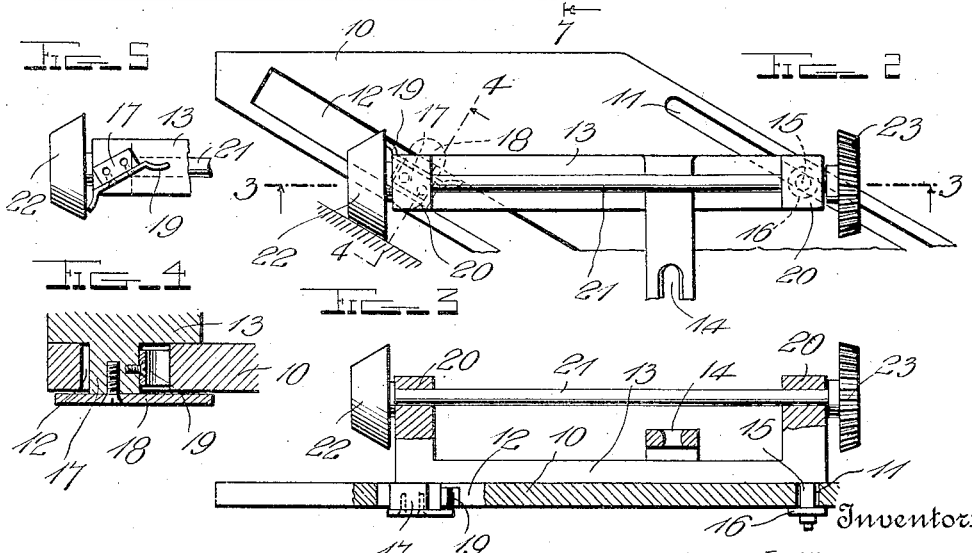
Witnesses:
Inventor:
James A. McLaughlin
by H. B. Willson & Co.
Attorneys.

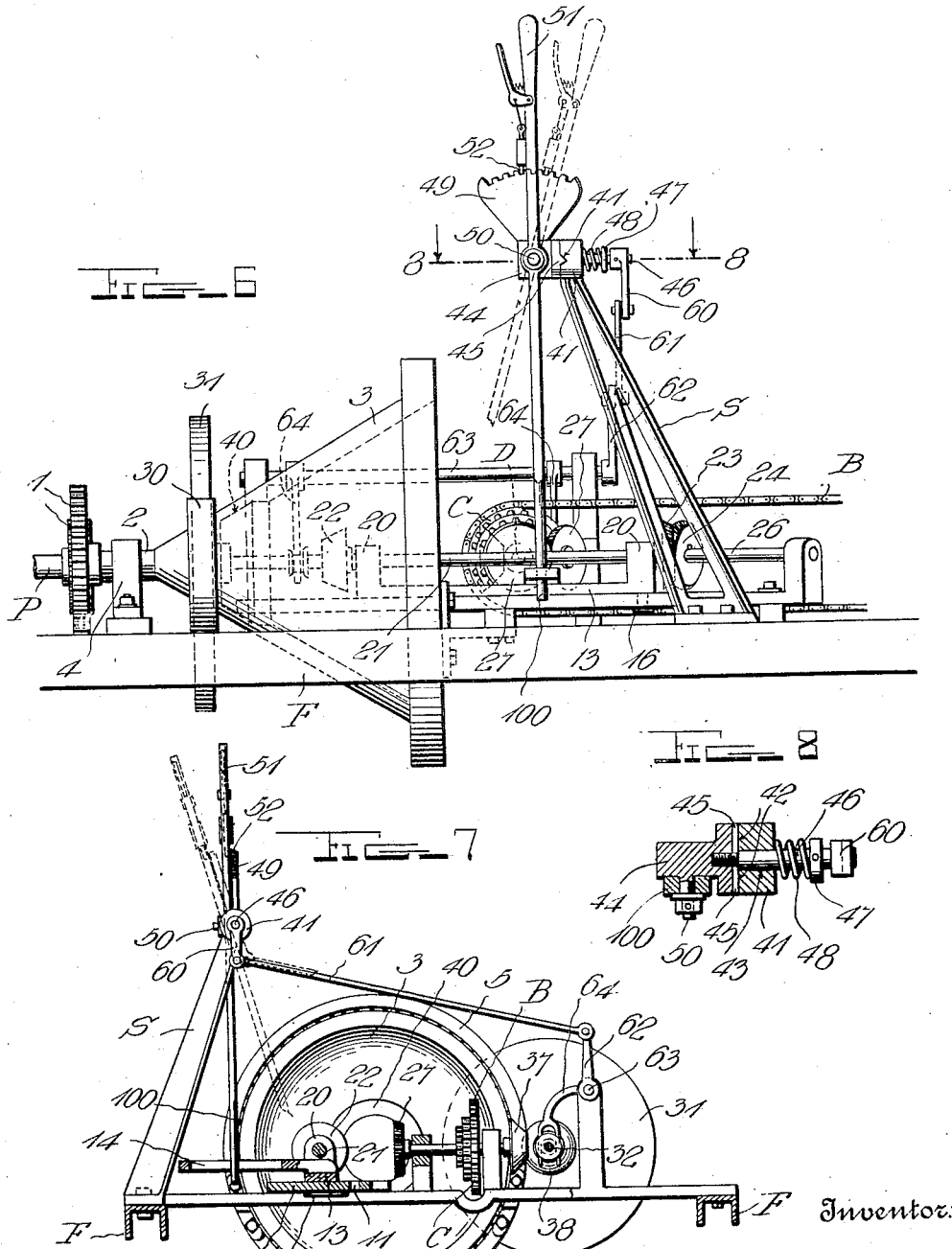

UNITED STATES PATENT OFFICE.

JAMES A. McLAUGHLIN, OF ODUM, GEORGIA.

FRICTION-GEARING.

1,036,134.  Specification of Letters Patent.  Patented Aug. 20, 1912.

Application filed February 1, 1912. Serial No. 674,646.

*To all whom it may concern:*

Be it known that I, JAMES A. MCLAUGHLIN, a citizen of the United States, residing at Odum, in the county of Wayne and State of Georgia, have invented certain new and useful Improvements in Friction-Gearing; and I do declare the following to be a full, clear, and exact description of the invention, such as will enable others skilled in the art to which it appertains to make and use the same.

This invention relates to machine elements, and more particularly to friction gearing; and the object of the same is to produce a transmission mechanism more especially applicable to gasolene engines and those usually employed on motor vehicles and the like, whereby the power of the driving shaft may be transmitted to the driven element at the desired speed in a forward direction or a low speed in a reverse direction.

A further object is to construct a transmission mechanism of this character so that the speed can be changed gradually and yet instantly stopped at any time, rather than step by step as with the transmission mechanisms employing gears and now in common use.

A further object is to render it impossible for the operator to change from a reverse drive to a direct at any speed of the latter except the lowest, or from any speed of the direct drive except its lowest to the reverse drive.

A further object is to provide a connection between the adjusting mechanism for controlling the speed on the direct drive, and the setting mechanism for actuating the reverse drive, whereby it will be impossible for the operator under any circumstances to engage both drives simultaneously with the driving cone.

These and other objects are carried out by the embodiment hereinafter more fully set forth and claimed, and as shown in the drawings wherein—

Figure 1 is a plan view of this entire mechanism, showing the parts set to produce a forward drive at medium speed. Fig. 2 is a fragmentary view showing the tracks on the main frame and the carriage which is adjustable thereon, and Fig. 3 is a sectional view on the line 3—3 of Fig. 2. Fig. 4 is a sectional detail on the line 4—4 of Fig. 2, and Fig. 5 is a bottom plan view of the parts shown in said detail. Fig. 6 is a side elevation of the controlling mechanism, more particularly illustrating the lever for producing the variable speeds and the reverse drive. Fig. 7 is a section on about the line 7—7 of Fig. 1. Fig. 8 is a sectional detail on the line 8—8 of Fig. 6.

In the drawings the letter P designates the power shaft which we may assume is driven by a gasolene engine (not shown and forming no part of the present invention), and D is the driven shaft here shown as provided with a cone of pulleys C any one of which may be connected by belting B with the machinery to be driven and which also need not be illustrated.

My improved transmission mechanism is interposed between the driving and driven shafts and mounted on a main frame F having suitable side bars and cross bars which need not be described in detail but whose structure will correspond with the necessities of the case. The power shaft P is geared as at 1 to a stub shaft 2 at the apex of a hollow cone 3, the stub shaft being mounted in a bearing 4 and the larger rear end of the cone being preferably mounted in a ball bearing 5, whereof the balls are removable from the race 6 through an opening at one side of the same normally closed by plug 7, and said race is supported in any suitable manner by one of the cross bars of the frame F. Mounted also on said frame is a substantially diamond-shaped plate 10 constituting a guide for the carriage to be described below, the same being provided with parallel slots 11 and 12 along its edges constituting the tracks of said guide and standing parallel with the inner wall of the hollow cone at one side of the same, as best seen in Fig. 1; and over this guide and on its tracks moves a carriage consisting of a substantially T-shaped member 13 (best seen in Figs. 2 and 3) whereof the shank is slotted as at 14 for a purpose to appear below and the head has a depending pin 15 at one extremity moving in the narrower slot 11 of the guide 10 and held from disengagement by a washer 16, while the other extremity of said head has a square block 17 mounted loosely in the wider slot 12 and held from disengagement therefrom by a washer 18 across its lower end as best seen in Fig. 4. While the pin 15 loosely but rather closely engages the slot 11, the block 17 has considerable lost motion or play within the slot 12, and a spring 19 secured to the side of this block presses it normally outward within the slot toward the wall of the cone 3 for a purpose to appear below.

Rising from the head of the carriage 13 are two bearings 20 in which is journaled a shaft 21, the forward end of the same having a beveled friction wheel 22 which the tension of said spring 19 throws normally into forcible contact with the inner wall of the cone 3, and the rear end of said shaft having a gear wheel 23 in constant mesh with another gear 24 whose grooved hub 25 is splined on an oblique shaft 26 suitably mounted in fixed journals on the frame F. This oblique shaft is connected in any suitable way with the driven element, as by intermeshing gears 27 as shown in Fig. 1; and in order that the gears 23 and 24 shall remain in constant mesh, a fork 28 has its stem mounted on the carriage 13 and its arms engaging the grooved hub 25 of the gear 24 so that the latter is slid along the shaft 26 when the carriage is adjusted by the mechanism hereinafter described.

The mechanism thus far described transmits power from the shaft P to the driven shaft D in one direction only and at the desired speed, because when the carriage 13 is adjusted to the left from the full lined position shown in Fig. 2 the friction wheel 22 is made to contact with the inner wall of the cone 3 nearer the apex of the latter and the speed of the driven gear 23 and hence of the driven element D is reduced, but when the carriage is adjusted to the right the friction wheel 22 is set farther toward the open rear end of the cone 3 whose wall at this point—being larger around—must rotate more rapidly, and this rapid movement is communicated to the driven element. I have illustrated in Fig. 1 in full lines the carriage set at an intermediate position, and in dotted lines only the shank of the carriage with its slot 14 and a sectional illustration, numbered 100, of the lower end of an operating lever which engages said slot and whose construction will be set forth hereinafter; but it is obvious that as said end 100 is moved to the left or to the right in Fig. 1 the entire carriage will be slid along upon the guide and the speed will be adjusted, but as said end 100 is moved toward the top of this figure of the drawing until it contacts with the upper extremity of the slot 14, the entire carriage 13 will be swung around its pivotal support 16 slightly so that the block 17 will be moved in the wider slot 12 against the tension of the spring 19 and the face of the friction wheel 22 will be thrown out of contact with the inner wall of the cone 3 so that power will be no longer communicated from the latter to the driven element D through this transmission mechanism.

The reverse mechanism of this improved device will now be described. Secured around the cone 3 near its apex is a fixed friction collar 30, with which is adapted to contact the face of a rather large friction wheel 31 that is mounted fast on a shaft 32 journaled in bearings 33 sliding on guides 34 and borne normally away from the cone 3 by springs 35; and said shaft carries a bevel friction wheel 38 adapted to make contact with another beveled friction wheel 37 that is fast on the driven shaft D at the opposite end thereof from the direct drive wheel 27. By this construction and arrangement of parts, it will be clear that when they stand as seen in Fig. 1 the friction wheels 31 and 38 are out of contact respectively with the collar 30 and the reverse friction wheel 37; but when said shaft 32 with the parts carried thereby is moved bodily inward toward the cone, the collar 30 on the latter rotates the large friction wheel 31 and through the shaft 32 the bevel friction wheel 38, and said wheel 38 turns the driven shaft D in the opposite direction so that a reverse drive is secured. Here again, any suitable means may be employed for moving the shaft 32 and its journal boxes 33 over their guides 34 and against the tension of their springs 35, but I prefer to employ the means hereinafter more fully set forth.

Thus is produced a friction gearing wherein a direct drive at variable speeds may be obtained by adjusting the carriage 13 toward or from the apex of the cone 3, the latter may be caused to run idle without any movement of the driven element D by throwing the friction wheel 32 out of contact with the inner face of the cone, and a reverse drive at a slow speed may be obtained by throwing the friction wheel 31 into contact with the collar 30. But in order to render the device absolutely safe so that as the operator adjusts the forward speed slower and slower he may come to a full stop and then throw in the reverse drive, I provide the interior of the cone 3 with an annular groove 40 near its apex and into which the face of the friction wheel 32 is pushed when the carriage 13 has been adjusted to the slowest speed of the forward drive.

The operating mechanism for this improved friction gearing will now be described, especial reference being had to Sheet 2 of the drawings.

Mounted on the frame F at any suitable place is a standard S carrying at its upper end a head 41 having a transverse groove 42 and through its body a horizontal hole 43 intersecting the center of said groove; and adjacent said head is disposed a block 44 having a V-shaped rib 45 adapted to engage said groove and a stud or bolt 46 passing through said hole as best seen in Fig. 8. Back of the head this stud carries a collar 47, and between the latter and the head is an expansive spring 48 whereby the rib 45 is thrown normally into engagement with the groove 42 as seen in Fig. 6. The block 44 carries a toothed sector 49 rising rigidly therefrom and has a pin 50 projecting from its base at the center of the arc on which the curved edge of said sector is struck, and on said pin is mounted the main lever 100 whose upper end has a handle 51 and carries a thumb latch 52 engaging the teeth of said sector in a well known manner, and whose lower end is adapted to engage the slot 14 in the carriage 13 as set forth above. By the construction described, said lever may swing from left to right and from right to left as seen in Fig. 6 as it turns around the pin 50, and may be locked by the thumb latch in any position to which it is set; and the lever and sector and block may be swung or turned in a plane at right angles thereto (as seen in dotted lines in Fig. 7) by forcing the rib 45 out of the notch or groove 42 in the head 41 against the tension of the spring 48, although it is the purpose of the latter to restore the parts normally to the position illustrated in Fig. 6.

If the standard S rises from the frame F at about the position shown in Fig. 1, its head will stand at such point that the lower end of the lever 100 when the latter is vertical will engage the center of the slot 41 as shown in full lines in this view, and when the lever is swung to either side on its pivot 50 its lower end will still engage the slot 14 in the shank of the T-shaped carriage 13 but the latter will be moved either to the right or to the left as seen in Fig. 1 in dotted lines; and it follows that movement of the handle 51 of the lever 100 to right or left will adjust the carriage to left or right and therefore produce slower speed or higher speed respectively. But if the handle is moved to the extreme right the friction wheel 22 will be moved into the groove 40 and therefore entirely out of contact with the inner wall of the cone 3 and the parts of this device will come to rest.

Depending from and rigidly secured to the outer end of the stud 46 is an arm 60 whose lower end is connected by a link 61 with an arm 62 which rises from a rock shaft 63 journaled in suitable bearings adjacent the shaft 32 of the reversing mechanism, and said shaft 63 has depending from it a pair of forks 64 which loosely embrace the shaft 32 as indicated in Fig. 7. By this construction, when the handle 51 of the main lever 100 is moved to the right or left as seen in Fig. 7 the rock shaft 63 is oscillated in its bearings and its forks 64 move the shaft 32 and its journal boxes 33 along their guides 34 so that the reversing mechanism is thrown into or out of operation, according to which way the main lever is moved.

By this construction and connection of parts it will be obvious that, in order to actuate the reversing mechanism, the lever must be moved in a plane at right angles to that in which it is moved in order to adjust the speed of the forward drive, and as soon as the operator's hold on the handle 51 is released, the spring 48 restores it to an upright position so that the reversing mechanism is thrown out of action. But the parts are so proportioned that a considerable movement of the handle 51 of the main lever is necessary to rock the shaft 63 sufficiently to engage the reverse mechanism. When the carriage 13 is adjusted far to the right in Fig. 1 to produce high speed, the slot 14 stands as there shown in dotted lines and the lower end of the lever is adjacent its upper end; it is impossible at this time to produce a reverse connection of parts, for if the handle 51 were moved in the proper direction the lower end 100 of the lever would move upward in this view and the only result would be that the friction wheel 22 would be thrown out of contact with the inner face of the cone 3 so that the transmission mechanism would come to rest. When the parts stand as seen in full lines in Fig. 1 so as to produce a medium speed in a forward direction, it is still impossible for the operator to manipulate the main lever so as to engage the reverse mechanism, and it is obvious that he would have to swing the handle of the main lever even farther in order to bring the transmission mechanism to a stop. But when the parts have been adjusted to produce low speed in a forward direction so that the slot 14 stands in the left hand dotted position in Fig. 1, it is possible that he could swing the main lever sufficiently to throw the friction wheel 22 out of contact with the inner face of the cone 3 and thus bring the transmission mechanism to a stop, and also bring the reverse mechanism into play. However, it is the intention that the parts shall be so proportioned that the operator will adjust the speed slower and slower until the friction wheel 22 is pushed into the groove 40, before he throws the reverse mechanism into action, and this will, in fact, be the natural course of events under ordinary circumstances. Thus it will be seen that I have produced an operating mechanism for this improved transmission mechanism by means of which a single lever is employed to produce any desired speed in a forward direction or a slow speed in a reverse direction, but wherein the construction is such that it is impossible for the operator to go from a high speed forward to any speed reverse or even from a medium speed forward into a reverse, and therefore he is compelled to slow down the speed of his transmission mechanism before throwing in the reverse. This is obviously highly desirable, because if the device were for instance applied to an automobile or connected up with any heavy piece of machinery which had considerable momentum, it would be dangerous for an unskilled or careless operator to suddenly change the direction of rotation of the power applied to said automobile or machine. Also it will be seen that by this construction it is necessary that the speed be adjusted from high to medium and from medium down to slow and very slow before the friction wheel 22 comes into the groove 40 and the parts come to rest.

I desire it understood that the embodiment of my idea herein described and illustrated is merely given for the purpose of showing one means whereby it may be carried out successfully, and I reserve the right to make such changes in details as come within the spirit of my invention. Moreover, the exact sizes, shapes, proportions and materials of parts are not essential to the successful operation of the whole.

What is claimed as new is:

1. In a friction gearing, the combination with a hollow cone whose wall has an annular groove in its inner face near its apex, and connections between said cone and the power mechanism; of a carriage mounted on guides within the cone on a line parallel with one side of its wall; means for adjusting the position of said carriage, a shaft journaled in said carriage and carrying a friction wheel, means for forcing the latter into contact with the inner wall of the cone, and connections between said shaft and the driven element.

2. In a friction gearing, the combination with a hollow cone whose wall has an annular groove in its inner face near its apex, and connections between said cone and the power mechanism; of a carriage movable on guides within the cone on a line parallel with one side of its wall, a shaft journaled in said carriage and carrying a friction wheel, a spring forcing said friction wheel normally into contact with the inner wall of the cone, means for manually moving this wheel in the opposite direction to throw it out of said contact, means for adjusting the position of the carriage, and connections between the shaft and the driven element.

3. In a friction gearing, the combination with a hollow rotary cone connected with the power mechanism, and a fixed plate therein having guides parallel with the inner face of the wall of said cone at one side; of a carriage having a pin loosely engaging one guide and a block engaging and narrower than the other, a spring carried by said block within the last-named guide and pressing the block normally toward the wall of the cone, a shaft journaled in said carriage and connected with the driven element, a friction wheel on the shaft and borne by said spring normally into contact with the cone, means for swinging the carriage to overcome the tension of said spring and move the friction wheel out of contact with the cone, and means for adjusting the position of the carriage in its guides, for the purpose set forth.

4. In a friction gearing, the combination with a hollow rotary cone connected with and rotated on its axis by the power mechanism, and two fixed guides within said cone paralleling each other and paralleling the inner face of the wall of the cone at one side thereof; of a carriage having a pin at one end mounted pivotally in one guide and a block at the other end loosely engaging the other guide, yielding means pressing said block normally toward the wall of the cone, manual means for pressing the block in the opposite direction, a shaft journaled in said carriage on a line parallel with the axis of the cone and connected with the driven element, a friction wheel on the shaft having a beveled face borne normally into contact with the wall of the cone, and means for adjusting said carriage bodily on the line of said guides and oblique to the axis of the cone, for the purpose set forth.

5. In a friction gearing, the combination with a rotary cone connected with the power mechanism, a guide extending parallel with one face of said cone, a carriage adjustable in said guide, and a shaft mounted in the carriage and having a friction wheel at one end adapted to contact with the cone and a beveled gear at the other end; of an oblique shaft mounted parallel with said guide and connected with the driven element, a gear whose hub is splined on this shaft and whose body engages said bevel gear, said hub having a groove, and a bracket mounted on said carriage and having a fork engaging said groove, for the purpose set forth.

6. In a friction gearing, the combination with a hollow rotary cone connected with the power mechanism and rotated on its axis thereby, an external collar around said cone, a carriage adjustable within said cone on a line along its wall at one side thereof, a shaft journaled in the carriage and having a friction wheel at one extremity engaging said wall, and connections between the other extremity of said shaft and the driven element; of a bevel friction wheel connected with the latter, a reversing shaft mounted in movable bearings and having a friction wheel at one end adapted to engage the bevel friction wheel and a large friction wheel at the other end adapted to engage said collar on the cone, and means for moving this shaft for the purpose set forth.

7. In a friction gearing, the combination with a cone axially connected with and rotated by the power mechanism, a carriage adjustable within the cone parallel with one side of its wall, a shaft mounted in the carriage and connected with the driven element, and a friction wheel on the shaft adapted to be forced into contact with said wall; of the reverse-driving mechanism connected with said friction element and including a friction wheel adapted to be moved into contact with the exterior of the cone, and operating devices connected with said carriage and reverse mechanism for throwing the latter and the direct drive alternately into operation.

8. In a friction gearing, the combination with a cone axially connected with and rotated by the power mechanism and having an annular groove, and the direct drive mechanism connected with the driven element and including a friction wheel movable longitudinally along one wall of said cone into and out of said groove; of the reverse drive mechanism movable radially toward and from the axis of the cone and also connected with said driven element, and operating devices connecting said mechanism, for permitting the adjustment of the direct drive mechanism to vary its speed or to set its friction wheel opposite said groove and for setting the friction wheel of the reverse drive mechanism into contact with the cone at this time.

9. In a friction gearing, the combination with a hollow cone axially connected with and rotated by the power mechanism, and a diamond-shaped plate fixed within said cone and having guides along opposite edges; of a T-shaped carriage having pins at the extremities of its head movably mounted in said guides and a slot in its shank standing at right angles to the length of this head, a shaft journaled in bearings along said head and having a friction wheel at one end adapted to be borne into contact with the wall of the cone and connections at its other end with the driven element, and an operating lever pivoted in the support and having one end loosely mounted in said slot.

10. In a friction gearing, the combination with a hollow cone axially connected with and rotated by the power mechanism, and a diamond-shaped plate fixed within said cone and having guides along opposite edges; of a T-shaped carriage having pins at the extremities of its head movably mounted in said guides and a slot in its shank standing at right angles to the length of this head, a shaft journaled in bearings along said head and having a friction wheel at one end adapted to be borne into contact with the wall, a spring normally producing such contact, connections between the opposite end of the shaft and the driven element, and an operating lever loosely mounted on a fixed support with its lower end engaging said slot and adapted when swung in one plane to adjust the carriage within said guides and when swung in the other plane to throw the friction wheel out of contact with the cone.

In testimony whereof I have hereunto set my hand in presence of two subscribing witnesses.

JAMES A. McLAUGHLIN.

Witnesses:
D. I. CARTER,
W. H. ASPINWALLS.